Dec. 13, 1966  K. LEITNER  3,290,768
BLIND FASTENER INSERTING TOOLS
Filed March 4, 1965  2 Sheets-Sheet 1

Inventor
Kajetan Leitner
By his Attorney
Carl E. Johnson.

Dec. 13, 1966 K. LEITNER 3,290,768
BLIND FASTENER INSERTING TOOLS
Filed March 4, 1965 2 Sheets-Sheet 2

United States Patent Office 3,290,768
Patented Dec. 13, 1966

3,290,768
BLIND FASTENER INSERTING TOOLS
Kajetan Leitner, 8939 Waal 187, Germany
Filed Mar. 4, 1965, Ser. No. 437,240
Claims priority, application Great Britain, Apr. 24, 1964,
17,007/64
7 Claims. (Cl. 29—267)

This invention relates to fastener inserting tools, more especially to tools for installing nuts in apertures of work pieces which are inaccessible from one side. As herein shown invention is embodied in a tool particularly well adapted for setting nuts having self-retaining collars which must be anchored in the wall of a work piece aperture, the tool initially transferring the entire nut through the aperture. It is to be noted that application of the invention is not limited to a tool of the construction herein illustrated, nor is the invention restricted to installing fasteners of the configuration or type disclosed herein for the purpose of illustration.

Nuts respectively having different shapes of collars are available for mounting in preformed holes of work pieces. The collars are usually concentric with an internally threaded bore of the nuts, and peripherally project from the base portions thereof according to the manner of the connection to be effected, the nature of the work piece being joined, and the shape of the collar receiving bore. The collar of a nut to be installed by the tool of the invention will perhaps most often be adapted to be press-fitted into its receiving bore, yet it is contemplated that the tool will also be capable of mounting a collar nut of the type requiring its collar portion first to be inserted into a bore and then rotated therein to deform the wall of the bore in order to be anchored therein.

In view of the foregoing it is a main object of this invention to provide a simple economical tool for mounting nuts in apertured, inaccessible walls.

A further object of the invention is to provide an improved, manually operable device by means of which a nut having an elongated base and a collar may be thrust endwise through a bore of a wall which is to receive the collar in its inaccessible side, and the nut thereupon be tilted from its end-first position and retracted to secure the collar in the bore with the base abutting the wall.

In accordance with these objects a feature of the invention resides in the provision of a tool for mounting collar nuts, comprising a tubular body, a member slidably disposed on one end of the body for abutting a work piece in a bore of which the collar of the nut is to be mounted, nut inserting means movable axially in the body and having an end adapted tiltably and releasably to carry the nut, an operating lever associated with the tubular body for effecting relative axial movement between the member and the inserting means, and means cooperative with the nut after its endwise insertion by the inserting means to tilt the nut and position its collar for retraction into the work piece bore.

The above and other features of the invention including novel details and combinations of parts will now be more particularly described in connection with an illustrative embodiment and with reference to the accompanying drawings in which.

Figure 1:
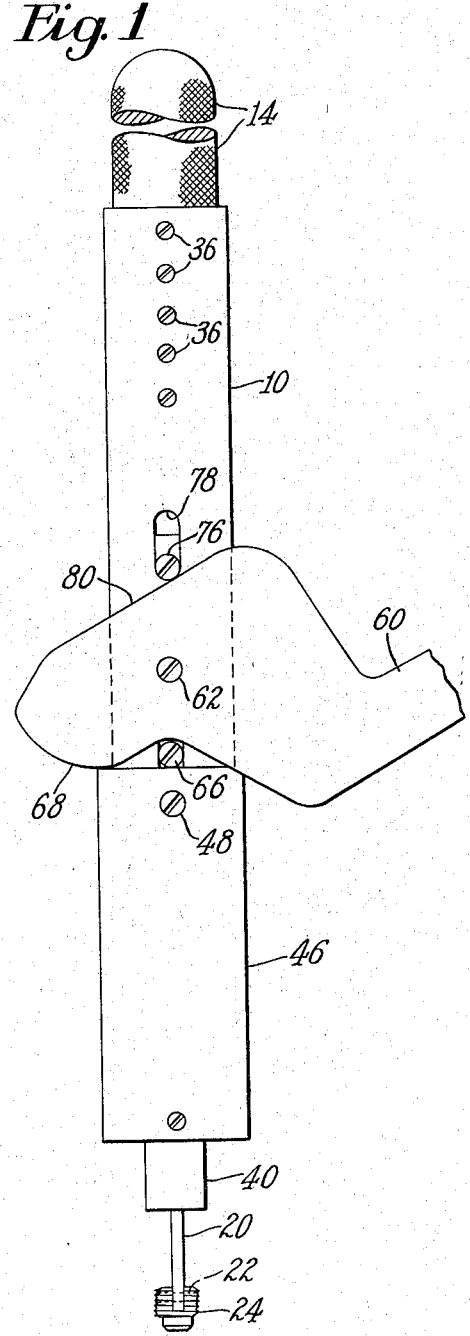
FIG. 1 is a view in side elevation, with a portion broken away, of a manually operable tool for installing blind collar nuts.
Figure 2:
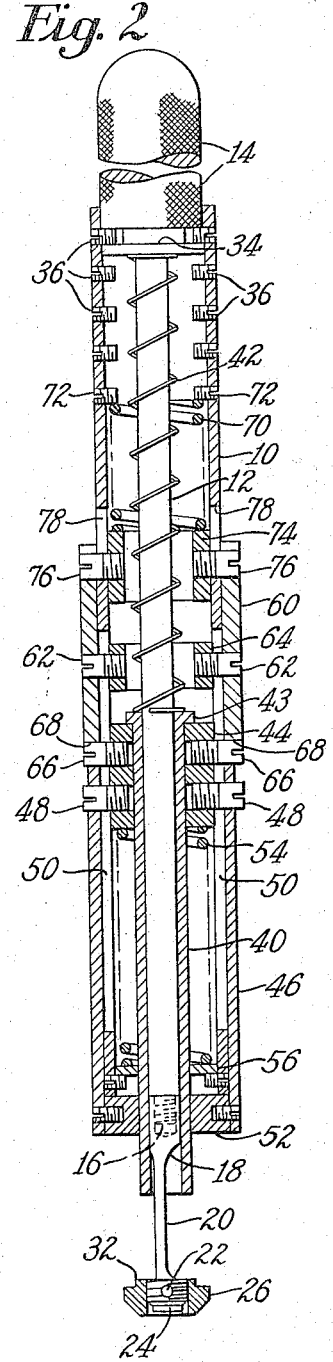
FIG. 2 is an axial section of the tool shown in FIG. 1, a collar nut being affixed to an extended inserter in readiness for mounting.
Figure 3:
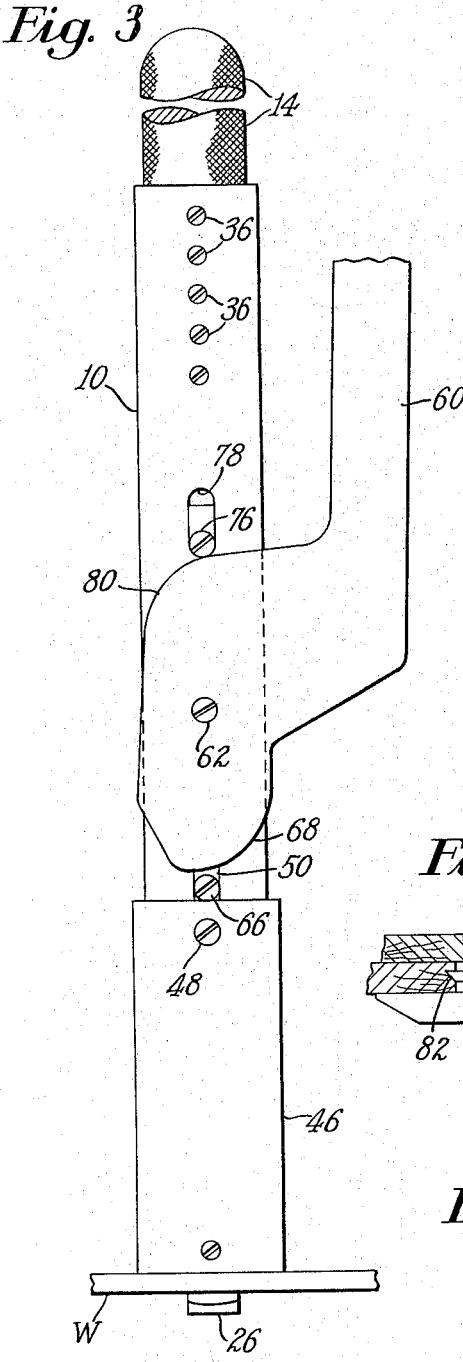
FIG. 3 is a view corresponding to FIG. 1 but showing the parts in their relative positions at that stage of installation when the collar of the nut has been retracted into a bore of a work piece.
Figure 4:
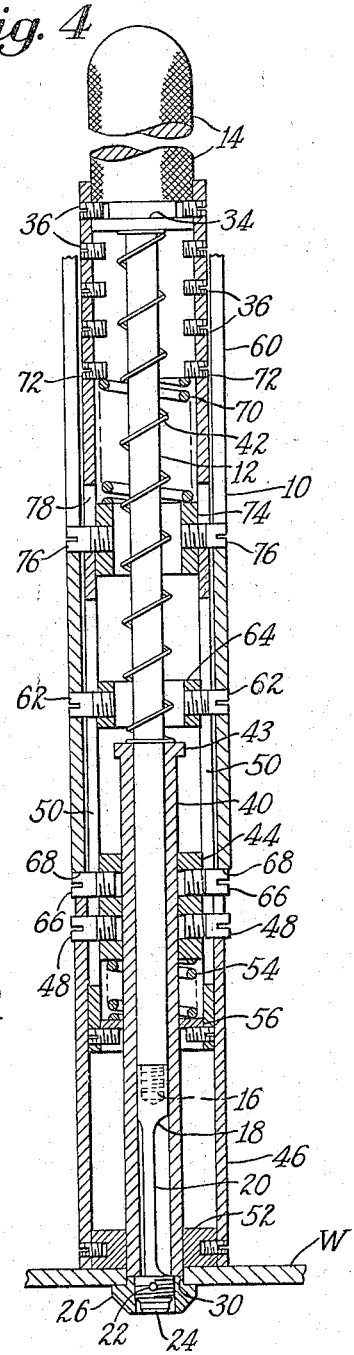
FIG. 4 is an axial section of the tool shown in FIG. 3 but taken at right angles to the plane thereof.
Figure 7:
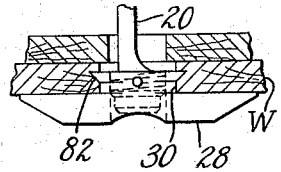
FIG. 7 is a detail view indicating a modified nut inserted by the tool.

The illustrative tool comprises a tubular main body 10 (FIGS. 1–4) having a circular cross section. Extending axially through the body 10 is a relatively retractable inserter or operating rod 12 (FIGS. 2 and 4) having at one end a knurled handle 14 by means of which the rod may be rotated for a means later mentioned. The other end of the rod is reduced to provide a threaded stud 16 for receiving a nut carrying stem 18. The lower end of this stem is enlarged from its slender intermediate portion 20 to carry a pivot pin 22 for a threaded head 24 of a diameter corresponding to that of the bore of a nut 26 or 28, for example, to be mounted in a work piece W (FIGS. 4 and 7). Interchangeable stems 18 having heads 24 respectively appropriate to the size of the bore of the nuts to be installed may accordingly be employed in the tool as will hereinafter be described.

Figure 5:
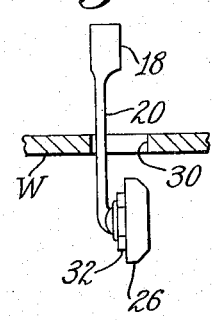
FIG. 5 is a detail view indicating the manner in which a collar nut has been inserted endwise by the tool through a bore in a wall wherein the nut is to be secured.
Figure 6:
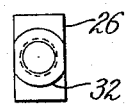
FIG. 6 is a plan view of one form of collar nut.

The nuts 26 and 28 are adapted to be inserted by the tool from one side only of the work piece. Their base portions are therefore elongated to span a receiving bore 30 when a collar portion 32 is secured therein as by a press-fit in the case of the nut 26 or an axial retraction followed by rotation in the case of the nut 28. FIG. 5 illustrates the nut 26 tilted on its stem 18 for endwise insertion through the bore 30, while FIG. 4 indicates the inserter 12 retracted to effect a press-fit of the nut 26. For initially determining the axial position of the inserter in the body 10 to adjust for different thicknesses of work pieces in which the nuts are to be mounted, the handle 14 has an annular groove 34 which may receive any one of several pairs of set screws 36 adjustably threaded into axially spaced bores formed in the body 10.

After its insertion through the bore 30, for effecting a pivotal movement on the pin 22 of a nut 26 or 28 from an endwise position (FIG. 5) to a position athwart the bore 30 (FIG. 4) a deflector tube 40 (FIGS. 2 and 4) serving as a guide for the inserter 12 and the stem 18 is disposed to engage and tilt the nut. The diameter of this tube 40 is such that it may extend through the bore 30. A spring 42 (FIGS. 2 and 4) surrounds the inserter rod, and acts between the handle 14 and the tube to urge the latter endwise toward the nut being mounted. For limiting such movement of the deflector tube, its inner end has a flange 43 engageable with an annular spacer 44 slidable axially within the body 10 and secured to a work engageable sleeve or abutment member 46 by means of opposed screws 48 (FIGS. 1 and 2) disposed respectively in axial slots 50 in the body. The work engaging end of the member 46 is provided with a plug 52 which is bored to guide the lower end of the deflector tube 40. The upper end of this tube is slidable in the spacer 44. A compression spring 54 (FIGS. 2 and 4) having one end abutting a disk 56 in the lower end of the body 10, and another end bearing on the spacer 44, causes the member 46 yieldably to return to a retracted position at the end of an inserting operation.

Operation of the tool is effected by means of a hand lever 60 pivotally mounted on axially alined fulcra 62, 62 threaded into a guide ring 64 which is slidable axially in the body 10, the fulcra 64 respectively projecting through the axial slots 50 formed in the body. For effecting relative axial movement of the work engageable member 46 and the body 10, a pair of alined screws 66, 66 project from the spacer 44 for cooperation with cam surfaces 68, 68 respectively formed on a forked end of the operating lever 60. Engagement between the cam surfaces 68 and the screws 66 is yieldingly maintained by a spring 70 one end of which bears on screws 72, 72 radially threaded into the body 10 and the other end of which bears on a ring 74 carrying guide screws 76, 76, these screws respectively extending through axial slots 78 of the body and bearing on surfaces 80, 80 of the lever 60. Accordingly pivotal movement of the lever 60 in a direction to close it on the body 10 meets, through the screws 66, an axial force which retracts the rod 12 with its nut carrying stem 18 to move the inserted nut, if still in its end-face position toward the adjacent projecting end of the deflector tube 40. In the course of this retraction an end portion of the nut may thus engage the tube and be pivotally deflected if necessary to assume a position wherein the base of the nut span the bore 30. After such deflection of the nut 26 substantially into its position transversely of the stem 18, further closing movement of the hand lever 60 withdraws the tube 40 from the bore 30 (i.e. relatively advances the member 46 on the tube) and causes the stem 18 to retract thereby forcing the nut collar 32 into the bore as shown in FIGS. 3 and 4. The handle 14 may now be rotated to unscrew the head 24 from the installed nut 26 thereby releasing the tool for the next installation.

If the nut 28 to be mounted is of the general type shown in FIG. 7 and has a collar 82 which is at least partly frusto conical, the collar 82 being of greater diameter in one plane than its diameter normal thereto in that plane, deformation of the wall of the bore 30 to lock the collar therein may be effected, after axial collar insertion in the bore as above described, by turning the tool about the axis of the body 10 in a direction opposite to that required for subsequent unthreading of the head 24. FIG. 7 illustrates the collar nut 28 installed with the stem 18 ready to be unthreaded by means of the head 24. Finally, returning the lever 60 to its open position shown in FIG. 1 projects the head 24 for receiving the next nut to be mounted.

Having thus described my invention, what I claim as new and desire to secure by Letters Patent of the United States is:

1. A tool for mounting blind nuts in holes formed in work pieces comprising a tubular body, a reaction member slidably mounted on one end of the body for abutting a work piece in a bore of which a nut is to be mounted, inserting means movable axially in the body and adapted tiltably and releasably to carry the nut endwise through the work piece bore, an operating lever pivotally associated with the body for effecting relative axial advancing and retractive movement of the reaction member and the inserting means, and means controlled by the operating lever for tilting the nut in the course of its retractive movement to position the nut athwart said work piece bore.

2. A tool as set forth in claim 1 wherein the inserting means includes an interchangeable stem provided with a pivot pin and a threaded head mounted on said pin for releasably carrying a nut.

3. A tool as set forth in claim 2 wherein the inserting means is relatively rotatable in the body to unthread the head from a nut carried thereby.

4. A tool as set forth in claim 1 wherein said nut tilting means and said inserting means are telescoped one within the other for relative axial movement.

5. A tool as set forth in claim 1 wherein the operating lever is mounted in the body on a fulcrum and has a cam surface operable to control relative axial movement of the work engaging member and said inserting means.

6. In a tool for mounting a collar nut having an elongated base in a hole in a work piece, a tubular main body, a work engageable member telescoped on the body and yieldable axially thereon, an inserter extending axially in the body and normally projecting yieldingly beyond the member, that portion of the inserter thus projecting including a stem for tiltably carrying the nut through said hole, a deflector yieldably extending from within the tool and adjacent to the stem to tilt a nut thereon by engagement therewith, and means operable, when the stem has carried a nut with its collar portion adjacent to the inaccessible end of the work piece hole, to retract the inserter relatively to the work engageable member thereby to force the collar portion into the hole and the nut base toward said inaccessible side of the work piece.

7. A tool for mounting nuts in holes formed in work pieces comprising a tubular body, a reaction member slidably mounted on one end of the body for abutting a work piece in a bore of which a nut is to be mounted, inserting means movable axially in the body and adapted tiltably and releasably to carry the nut endwise through the work piece bore, an operating means mounted on the body for effecting relative axial advancing and retractive movement of the reaction member and the inserting means, and means controlled by the operating means for tilting the nut in the course of its retractive movement to position the nut athwart said work piece bore.

References Cited by the Examiner

UNITED STATES PATENTS 1,371,861   3/1921   Clark _____ 29—267 X

FOREIGN PATENTS 734,814   4/1943   Germany.

WILLIAM FELDMAN, *Primary Examiner.*

JAMES L. JONES, JR., *Examiner.*